United States Patent [19]

Litterst

[11] Patent Number: 5,616,913
[45] Date of Patent: Apr. 1, 1997

[54] DEVICE FOR CONCENTRATING SOLAR RADIATION

[75] Inventor: Thomas Litterst, Stuttgart, Germany

[73] Assignee: Deutsche Forschungsanstalt fuer Luft- und Raumfahrt e.V., Bonn, Germany

[21] Appl. No.: 575,297

[22] Filed: Dec. 20, 1995

[30] Foreign Application Priority Data

Dec. 23, 1994 [DE] Germany .......................... 44 46 303.0

[51] Int. Cl.$^6$ ..................................................... F24J 2/38
[52] U.S. Cl. ..................................... 250/203.4; 126/578
[58] Field of Search ........................... 250/203.4, 203.3; 126/573, 574, 578, 600, 603, 688, 683

[56] References Cited

U.S. PATENT DOCUMENTS

| | | | |
|---|---|---|---|
| 4,013,885 | 3/1977 | Blitz | 250/203 R |
| 4,442,348 | 4/1984 | Snyder | 250/203 R |
| 5,253,637 | 10/1993 | Maiden | 126/696 |

Primary Examiner—Edward P. Westin
Assistant Examiner—Alan L. Giles
Attorney, Agent, or Firm—Barry R. Lipsitz

[57] ABSTRACT

Solar radiation is concentrated onto an absorber which includes a concentrator element. The concentrator element concentrates incident solar radiation in a focal spot on the absorber to obtain a measurable variable which reliably characterizes the alignment of the concentrator element on the sun. The variable is independent of variations in the apparent position of the sun, weather influences, thermal expansion, and play in the suspension of the concentrator element. The device measures the flux density of the solar radiation in the region of the focal spot using an inlet opening, through which part of the solar radiation passes, a diffuser for reducing the flux density of the solar radiation, and a detector for measuring the flux density which is reduced by the diffuser.

24 Claims, 3 Drawing Sheets

DEVICE FOR CONCENTRATING SOLAR RADIATION

The present invention relates to a device for concentrating solar radiation onto an absorber, comprising a concentrator element which concentrates incident solar radiation in a focal spot on the absorber.

A large number of devices of this type for concentrating solar radiation are known.

In order to achieve as great a radiation flux as possible at the absorber, the concentrator elements of these devices must continuously track the sun, i.e. an optical axis of the concentrator element must be synchronized with an average direction of incidence of the solar radiation.

Devices for concentrating solar radiation are known, the concentrator elements of which are pivoted for this purpose with the aid of stepping motors having a constantly predetermined drive speed. Such a control of the alignment of the concentrator elements does not, however, result in an optimum alignment since the required tracking speed varies during the course of a year and, moreover, the apparent position of the sun depends on atmospheric conditions which are subject to constant change in an unforeseeable manner.

Furthermore, devices for concentrating solar radiation are known, in which light sensors, which measure the unconcentrated flux density of the solar radiation coming directly from the sun and the measurement signals of which are used for regulating the alignment of the concentrator element, are arranged on a carrier of a concentrator element. Such light sensors which are arranged on a carrier of a concentrator element are, however, easily irritated, for example by cloud effects. In addition, the alignment of these sensors relative to the optical axis of the concentrator element can vary considerably, for example on account of thermal expansion, wind pressure, play in the suspension of the concentrator element or optical errors of the concentrator element.

The object underlying the present invention is, therefore, to improve a device of the generic type such that a measurable variable which reliably characterizes the alignment of the concentrator element on the sun, independent of variations in the apparent position of the sun and of weather influences, is available.

This object is accomplished in accordance with the invention, in a device of the type described at the outset, in that the device has at least one measuring means for measuring the flux density of the solar radiation in the region of the focal spot and that the measuring means comprises an inlet opening, through which part of the solar radiation passes into the measuring means, a diffuser for reducing the flux density of the solar radiation reaching the measuring means and a detector for measuring the flux density reduced by means of the diffuser.

The inventive concept offers the advantage that the variable of primary interest, namely the flux density of the solar radiation in the region of the focal spot, is measured immediately, whereby the numerous sources of error which have been partially specified in the above are precluded. The quality of the alignment of the concentrator element on the sun can be concluded directly from the flux density of the solar radiation measured in the region of the focal spot.

The use of a diffuser to reduce the flux density of the solar radiation reaching the measuring means enables the extremely high radiation flux densities in the region of the focal spot of several MW/m$^2$ to be measured with conventional optical radiation detectors, which was previously impossible since these detectors were melted by the concentrated solar radiation.

It is, in principle, possible to use the measurement result obtained by way of the measuring means to align the concentrator element on the sun manually and in an optimum manner.

It is, however, of advantage when the device has a regulating means which alters the relative alignment of the concentrator element in relation to the solar radiation as a function of the result of the measurement. Due to the regulation of the alignment of the concentrator element, this always remains optimally aligned on the sun without any intervention by operating personnel. This results in a maximum radiation flux to the absorber and a high symmetry of the focal spot on the absorber, whereby the risk of the absorber breaking down, which can occur when high temperature gradients result on account of an asymmetric distribution of radiation flux density in the focal spot, is minimized.

To further reduce the radiation flux density incident on the detector, it is favorable when the measuring means has an inlet passage, through which part of the solar radiation reaches the inlet opening. Due to such a preconnected inlet passage, the solid angle, from which solar radiation reaches the inlet opening, is limited. The length of the inlet passage preferably corresponds at least to the greatest linear extension of the inlet opening.

If, on the other hand, the detector signal is desired to be largely independent of the direction of incidence of the solar radiation, it is of advantage when the inlet passage is as short as possible, preferably smaller than the linear extension of the inlet opening.

It is, in principle, possible to provide a single measuring means in the region of the focal spot and alter the alignment of the concentrator element manually or by a regulating means such that the signal of the detector of this measuring means adopts a predetermined value.

It is, however, of advantage when the device comprises at least one pair of measuring means. Variations in the radiation flux coming from the sun affect the measuring means of the pair in a comparable manner and so variations in the radiation flux density which are independent of the alignment of the concentrator element, for example as a result of variations in the radial distribution of the radiation flux density of the solar radiation coming from the sun (so-called "sun shape"), can be eliminated by forming the difference between the detector signals of the two measuring means.

It is favorable when a straight line connection connecting the inlet openings of the measuring means of the pair with one another intersects an optical axis of the concentrator element. In this case, a focal spot which is symmetric to the optical axis along the straight line connection connecting the inlet openings of the measuring means of the pair with one another can be adjusted by pivoting the concentrator element until the difference between the detector signals of the two measuring means of the pair results in a predetermined value.

The inlet openings of the measuring means of the pair are advantageously arranged symmetric to the optical axis of the concentrator element. Variations in the radiation flux coming from the sun affect each measuring means of the pair in the same manner and so a focal spot symmetric to the optical axis along a straight line connection connecting the inlet openings of the measuring means of the pair with one another can always be adjusted by pivoting the concentrator element until the difference between the detector signals of the two measuring means of one pair is minimal.

It is particularly advantageous when a straight line connection connecting the inlet openings of the measuring means of the pair with one another is aligned essentially at right angles to a pivot axis of the concentrator element. In this case, the difference signal of the detectors of the pair can be used directly to set the pivot angle of the concentrator element about this pivot axis correctly.

It is favorable when the device comprises at least two pairs of measuring means, the inlet openings of the measuring means of each pair being arranged symmetric to the optical axis of the concentrator element.

In this respect, it can be provided, on the one hand, for a straight line connection connecting the inlet openings of the measuring means of one pair with one another to be aligned transversely, in particular at right angles, to a straight line connection connecting the inlet openings of the measuring means of an additional pair with one another. This means that two difference signals (one each from the two detectors associated with the same pair) are obtained which allow two pivot angles of the optical axis of the concentrator element to be determined and, therefore, the optimum alignment of the concentrator element to be specifically determined.

Supplementary or as an alternative thereto, it can also be provided for a straight line connection connecting the inlet openings of the measuring means of one pair with one another to be aligned parallel to a straight line connection connecting the inlet openings of the measuring means of an additional pair and for the inlet openings of the measuring means of the one pair to have a greater radial distance from the optical axis of the concentrator element than the inlet openings of the measuring means of the additional pair. With the aid of the difference signal from the detectors of the pair with the inlet openings farther removed from the optical axis, the concentrator element can, in this case, also be optimally aligned even when the center of the focal spot has a greater radial distance from the optical axis of the concentrator element than the inlet openings of the pair arranged closer to the optical axis. Moreover, an optimum alignment of the concentrator element is also still possible should one of these pairs of measuring means break down.

With respect to the structure of the diffuser, no details have so far been given.

The diffuser advantageously has a surface diffusely reflecting the solar radiation reaching the measuring means. Due to diffuse reflection, the flux density of the solar radiation coming in through the inlet opening is reduced independently of its direction of incidence in an effective manner.

It is favorable when the diffuser comprises a hollow body which is closed except for the inlet opening and an outlet opening for the detector. The high flux density of the solar radiation coming in through the inlet opening is, in this case, clearly reduced by multiple diffuse reflection on the inner walls of the closed hollow body and so the flux density of the solar radiation passing through the outlet opening into the detector is too slight to damage it.

It is favorable when the closed hollow body has the shape of a hollow sphere. Due to the spherical shape of the detector it is possible for the indirect intensity of illumination, which is caused by diffuse reflection of the solar radiation coming in through the inlet opening, to be equally large at every location of the inner wall of the hollow sphere and to be proportional to the radiation flux altogether reaching the hollow sphere. This effect is also utilized, for example, in the so-called Ulbricht sphere-type photometer for measuring degrees of reflection in accordance with DIN (German Industrial Standard) 5036, Part 3, Section 4. This results in an essentially linear dependence of the radiation flux reaching the detector on the radiation flux reaching the measuring means and an extensive independence of the detector signal from the position of the outlet opening for the detector.

With a view to an inexpensive production, it is of advantage when the closed hollow body comprises two recesses in two solid bodies abutting on one another since these are, generally, easier to manufacture than a cavity in an undivided solid body.

Since the reduction factor of the flux density of the solar radiation reaching the measuring means corresponds essentially to the ratio of the area of the inlet opening to the diffusely reflecting surface of the diffuser, this diffusely reflecting surface is advantageously very much larger, preferably larger by at least a factor of 100, than the area of the inlet opening. The reduction in the flux density of the solar radiation when entering the detector is correspondingly large.

No details have so far been given concerning the structure of the diffusely reflecting surface of the diffuser.

It is of advantage when the diffusely reflecting surface has a degree of reflection, which is essentially independent of the frequency of the incident radiation, of approximately 0.7 to 0.9. At a higher degree of reflection, a spatial variation thereof has a greater effect which leads to an uneven illumination of the diffuser. At a lower degree of reflection, the areas of the diffuser directly illuminated by the solar radiation reaching the measuring means are heated up too strongly due to absorption.

The desired degree of reflection is achieved in a favorable manner when the diffusely reflecting surface is provided with a dull-white paint.

It is particularly favorable when the degree of reflection of the diffusely reflecting surface essentially does not vary from room temperature up to a temperature of over 1000° C. which can, for example, be achieved by using a paint resistant to high temperatures. An alteration in the solar radiation flux reaching the detector on account of an alteration in the degree of reflection of the diffusely reflecting surface due to heating during operation of the device for concentrating solar radiation is thereby avoided.

As an alternative or supplementary to the use of a paint resistant to high temperatures, it can also be provided for the diffuser to be cooled.

At least the inlet opening and the diffuser of the one or more measuring means is advantageously arranged in an aperture stop of the device for concentrating solar radiation. In this case, no additional element is required in the beam path of the solar radiation. In addition, it is ensured by arranging the entry opening in the aperture stop that the effective radiation flux to the absorber is not reduced by the measurement.

In order to avoid any damage to the detector and to obtain a linear interrelation between the flux densities of the solar radiation reaching the diffuser and the detector, respectively, solar radiation should be prevented from passing directly from the inlet opening to the detector.

This can be achieved when the outlet opening for the detector is arranged in the immediate vicinity of the inlet opening.

As an alternative or supplementary thereto, the measuring means can have a shield which prevents solar radiation from passing directly from the inlet opening to the detector.

No details have so far been given concerning the type of detector.

The detector advantageously comprises an optical detector which, in contrast to thermal detectors, detects changes in the incident radiation flux more or less free of inertia.

It is favorable, for the direct generation of an electrical detector signal, to use a semiconductor photodetector.

In addition, it is of advantage when the detector comprises a light guide coupled to the diffuser. This provides the possibility of generating the detector signal at a place which is far removed from the focal spot and, therefore, is not subject to any elevated temperature.

Additional features and advantages of the invention are the subject matter of the following description as well as the drawings showing one embodiment.

In the drawings.

Elements which are the same as one another or equivalent are designated in all the Figures with the same reference numerals.

Figure 1:
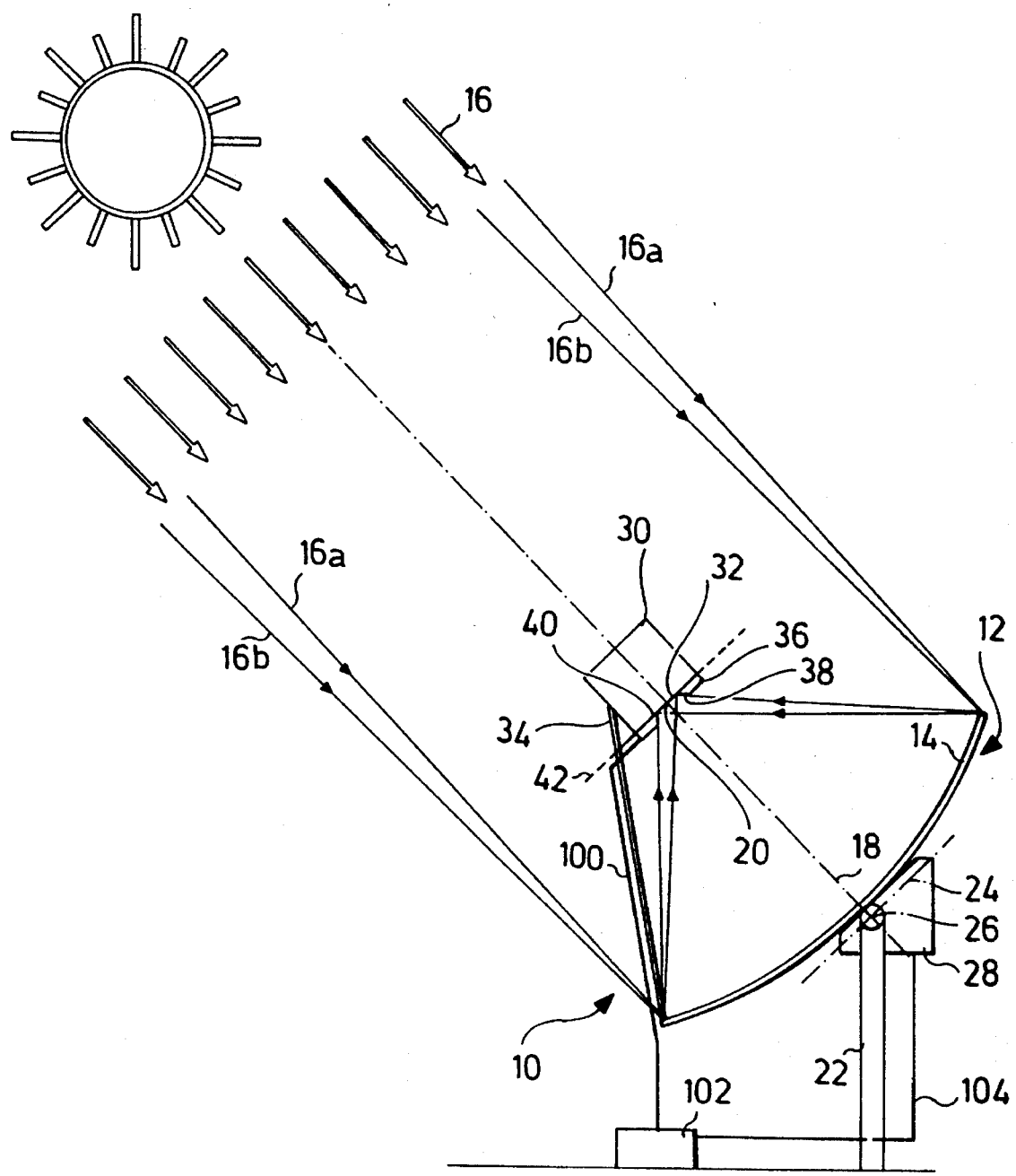
FIG. 1 is a schematic illustration of a first embodiment of an inventive device for concentrating solar radiation.

An inventive device for concentrating solar radiation, illustrated schematically in FIG. 1 and designated as a whole as 10, comprises a concentrator element 12.

The concentrator element 12 has a mirror 14, for example a parabolic mirror, which images bundles of light rays 16 coming in parallel to its optical axis 18 onto a focal point 20 arranged on the optical axis 18.

The mirror 14 is held by a mirror support 22 so as to be pivotable about a first pivot axis 24 and a second pivot axis 26 aligned transversely to the first pivot axis 24 by way of a moving means 28. In FIG. 1, the first pivot axis 24 and the second pivot axis 26 are, for example, aligned at right angles to one another and at right angles to the optical axis 18 of the mirror 14, the second pivot axis 26 extending at right angles to the plane of drawing.

A, for example, cylindrical absorber 30 is arranged on the optical axis 18 of the mirror 14 such that an absorbing end wall 32 of the absorber 30 facing the mirror 14 intersects the optical axis 18 essentially at right angles near to the focal point 20. The absorber 30 is supported by a holder 34 arranged on the mirror 14 and is fixed in its position relative to the focal point 20.

Alternatively to the absorber 30 illustrated in FIG. 1 which is irradiated on its outside, a cavity absorber which is irradiated in its interior can also be provided.

The absorber 30 serves to convert the solar radiation energy it receives into, for example, chemical or thermal energy.

The absorbing end wall 32 of the absorber 30 bears a circular ring-shaped aperture flange 36, the symmetrical axis of which coincides with the optical axis 18 of the mirror 14 and which has a frustum-shaped ring opening 38 which widens towards the mirror 14 and the edge 40 of which facing away from the mirror 14 is located in a focal plane 42 of the mirror 14 extending through the focal point 20 at right angles to the optical axis 18.

Figure 2:
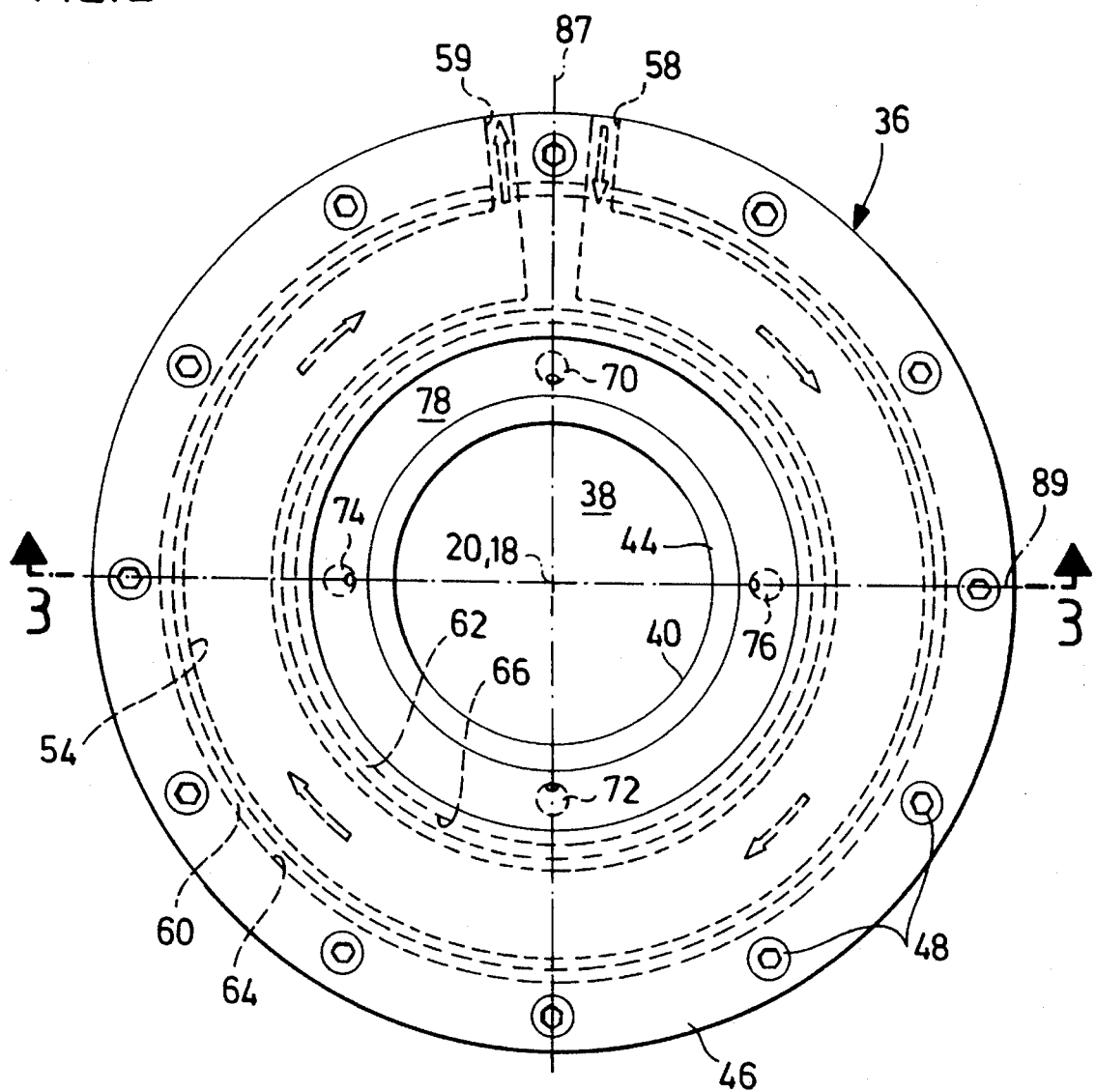
FIG. 2 is a plan view of an aperture flange of the first embodiment of an inventive device for concentrating solar radiation from FIG. 1.
Figure 3:
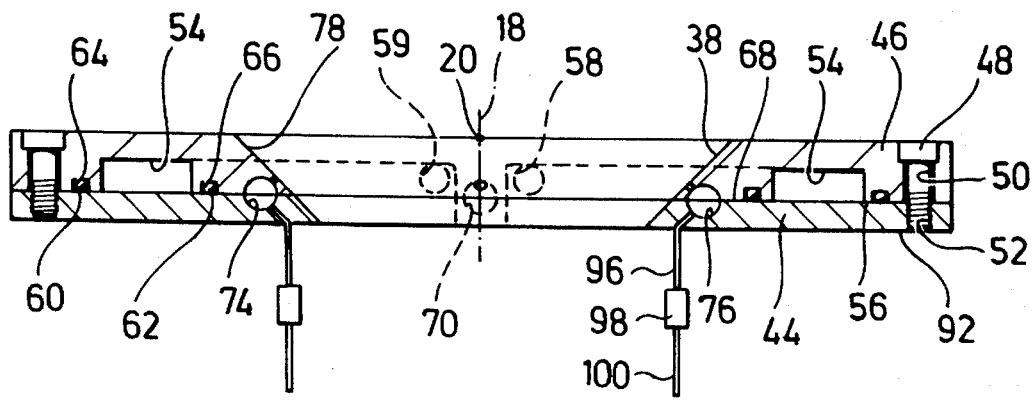
FIG. 3 is a cross section through the aperture flange from FIG. 2 along line 3—3.

Details of the aperture flange 36 are illustrated in FIGS. 2 and 3.

The aperture flange 36 comprises a lower part on the side of the absorber and an upper part 46 on the side of the mirror which abut against one another along a plane parallel to the focal plane 42 and are joined to one another by means of several screws 48. These screws penetrate axial through bores 50 arranged along the outer circumference of the upper part 46 and are screwed into axial threaded bores 52 which are arranged in the lower part 44 and each aligned with one of the axial through bores 50.

The upper part 46 has a cooling channel 54 in the form of a groove which is in the shape of a circular arc, extends concentrically to the ring opening 38 through an angle of approximately 350°, has a rectangular cross section and is arranged on an underside 56 of the upper part 46 facing the lower part 44. The cooling channel 54 is connected at a first end with a coolant supply line (not illustrated) via a radial supply bore 58 in the upper part 46 and at a second end with a coolant return line (not illustrated) via a radial discharge bore 59 in the upper part 46.

The cooling channel 54 serves to cool the aperture flange 36 during operation of the device 10 for concentrating solar radiation with a coolant (for example, water) which flows from the coolant supply line through the supply bore 58, the cooling channel 54 and the discharge bore 59 into the coolant return line.

Coolant is prevented from escaping from the cooling channel 54 along the underside 56 by two sealing rings 60, 62 which are arranged in two circular grooves 64, 66 on the underside 56 of the upper part 46, these circular grooves being concentric to the cooling channel 54 and having a respectively larger and smaller diameter than this channel, and abut against an upper side 68 of the lower part 44.

Furthermore, the aperture flange 36 has four hollow spheres 70, 72, 74 and 76 which are arranged near to a boundary wall 78 of the frustum-shaped ring opening 38, which is inclined towards the optical axis 18.

The hollow spheres 70, 72, 74 and 76 have the same radial distance from the optical axis 18 and are located opposite one another in pairs, advantageously in such a manner that a straight line connection through the center points of the hollow spheres 70 and 72 forming a first pair is aligned parallel to the first pivot axis 24 and a straight line connection through the center points of the hollow spheres 74 and 76 forming a second pair is aligned parallel to the second pivot axis 26 of the mirror 14.

Figure 4:
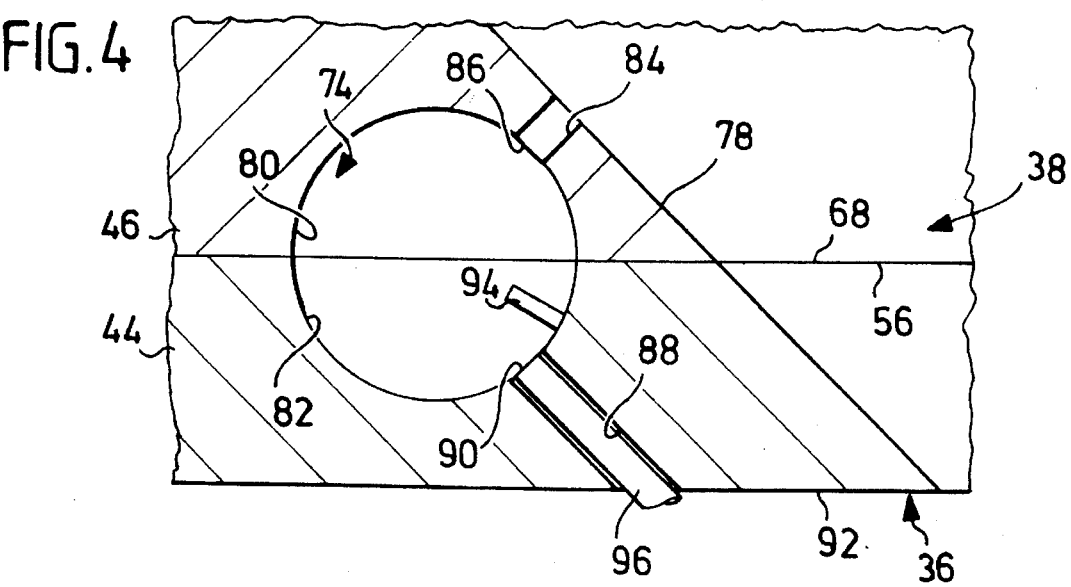
FIG. 4 is an enlarged section from FIG. 3, comprising a measuring means.

The design of the hollow spheres 70, 72, 74 and 76 is identical and will be explained in detail with the example of the hollow sphere 74 illustrated on an enlarged scale in FIG. 4.

The hollow sphere 74 comprises two semispherical recesses 80, 82 aligned with one another on the underside 56 of the upper part 46 and the upper side 68 of the lower part 44, respectively, of the aperture flange 36. Such a construction of the hollow sphere 74 from two semispheres 80, 82 is particularly favorable from a production point of view. The two semispheres 80, 82 have, for example, a diameter of 10 mm. The surface of the semispherical recesses 80, 82 is provided with a dull-white paint which is resistant to high temperatures and does not essentially alter its reflectivity from room temperature up to a temperature of 1300° C.

A, for example, cylindrical inlet passage 84 opens into the recess 80 in the upper part 46 at an inlet opening 86 having, for example, a circular surface area.

A straight line connection 87 connecting the center points of the inlet openings 86 of the hollow spheres 70 and 72 with one another is aligned parallel to the first pivot axis 24, a straight line connection 89 connecting the center points of the inlet openings 86 of the hollow spheres 74 and 76 with one another is aligned parallel to the second pivot axis 26 of the mirror 14.

At its end facing away from the inlet opening 86, the inlet passage 84 opens onto the boundary surface 78 of the ring opening 38. The inlet passage 84 can, for example, be aligned at right angles to the boundary surface 78 and have a diameter of 1 mm which corresponds approximately to one tenth of the interior diameter of the hollow sphere 74.

A, for example, cylindrical glass fiber passage 88 opens into the recess 82 in the lower part 44 of the aperture flange 36 at a passage opening 90 having, for example, a circular surface area. At an end facing away from the passage opening 90, the glass fiber passage 88 opens onto an underside 92 of the lower part 44 of the aperture flange 36. The glass fiber passage 88 can extend, for example, parallel to the boundary surface 78. Alternatively thereto, the glass fiber passage 88 can also extend parallel to the upper side 68 of the lower part 44.

A shield 94 impervious to light is arranged between the passage opening 90 and the inlet opening 86 and this shield intersects each straight line connection between a respective point of both the passage opening 90 and the inlet opening 86 so that no light can reach the passage opening 90 on a direct path from the inlet opening 86. The shield 94 can, as illustrated in FIG. 4, be arranged directly on the surface of one of the semispheres 80 or 82 or be held on this surface by at least one holder. In order to be able to keep the dimensions of the shield 94 small, it is of advantage when the angular distance between the passage opening 90 and the inlet opening 86 in relation to the center point of the hollow sphere 74 is as small as possible.

If the shield 94 is held by a holder, it is preferably arranged in front of the passage opening 90 coaxially thereto.

A glass fiber 96 is inserted into the glass fiber passage 88 and this glass fiber ends, on the one hand, at the passage opening 90 and, on the other hand, at a light detector 98 (schematically illustrated in FIG. 3).

Together with the light detector 98 associated with it, each of the hollow spheres 70, 72, 74 and 76 acting as diffuser forms a respective measuring means for measuring the flux density of the solar radiation incident on the aperture flange 36.

Each light detector respectively associated with one of the hollow spheres 70, 72, 74 and 76 is connected with a regulating means 102, for example a PID regulator, via a connecting line 100 (illustrated in FIG. 1). An electrical detector signal can pass from the light detector 98 to the regulating means 102 via the connecting line 100.

The regulating means 102 is, for its part, connected with the moving means 28 via a connecting line 104, via which electrical control signals can pass from the regulating means 102 to the moving means 28.

The device 10 described above for concentrating solar radiation onto an absorber 30 functions as follows:

First of all, it is assumed that the concentrator element 12 is optimally aligned on the sun, for example by manual control of the moving means 28; bundles of rays 16 coming straight from the sun therefore impinge on the mirror 14 on an average parallel to the optical axis 18. On account of the non-fading extent of the solar disk, the incident solar radiation is composed of bundles of rays which are inclined through small angles (up to approximately 0.25°) in relation to the optical axis 18 (as shown in FIG. 1 for bundles of rays 16a and 16b forming maximum angles with the optical axis 18) and so the individual bundles of rays are not all imaged by the mirror 14 onto the focal point 20 but mostly onto a different point in the focal plane 42. In this way, a focal spot which is radially symmetric to the focal point 20 and has an essentially gaussian radiation flow density profile results in the focal plane 42.

In the center of the focal spot, the radiation flux density can be more than 5000 times the non-concentrated solar radiation flux density. With increasing distance from the focal point 20, the radiation flux density does decrease but at the surface of the aperture flange 36 it is still several hundred $kW/m^2$ and is therefore too large to be measured with conventional optical methods.

A small part of the solar radiation flux impinging on the boundary surface 78 passes through the inlet passages 84 into a respective one of the hollow spheres 70, 72, 74 or 76.

On account of the shading effect of the shield 94, no light can reach the passage opening 90 directly from the inlet opening 86. The passage opening 90 and the end of the glass fiber 96 located there are, on the contrary, only indirectly illuminated by light rays which have been reflected at least once on the wall of the hollow sphere 70, 72, 74 or 76 after entering it. Due to the spherical shape of the hollow spheres 70, 72, 74 and 76 and on account of the reflection capacity which is the same over their entire wall surfaces, the indirect illumination is uniform and proportional to the overall light flux in the relevant hollow sphere 70, 72, 74 or 76. Since the entire wall surface of the hollow sphere 70, 72, 74 or 76 is greater by about two orders of magnitude than the area of the inlet opening 86, the radiation flux density at the passage opening 90 is reduced by a corresponding factor in comparison with the radiation flux density at the inlet opening 86. The hollow spheres 70, 72, 74 and 76 therefore act as diffusers for reducing the flux density of the solar radiation coming in through the inlet passages 84.

The radiation flux density reduced in this way is coupled into the glass fiber 96 without damaging it and thus reaches the associated light detector 98 which generates an electrical detector signal corresponding to the reduced radiation flux.

The signal of each detector 98 is conveyed via the associated line 100 to the regulating means 102, in which the signals associated with the same respective pair of hollow spheres 70, 72 or 74, 76 are compared with one another.

The detector signals are calibrated such that with an optimum alignment of the concentrator element 12 on the sun and, consequently, a focal spot radially symmetric to the focal point 20 the signals associated with the hollow spheres 70 and 74 are of the same size as the signals associated with the opposite located hollow spheres 72 and 76, respectively.

If the detector signals associated with the hollows spheres 70 and 72, on the one hand, and 74 and 76, on the other hand, are respectively equal to one another, the regulating means 102 does not, therefore, actuate the moving means 28.

If, however, the alignment of the concentrator element 12 deviates from the optimum alignment on the sun during the course of time due to the relative movement between the sun and the concentrator element 12, the focal spot generated by the mirror 14 becomes unsymmetric with respect to the focal point 20, which means that the radiation fluxes passing through the entry passages 84 into the hollow spheres and, consequently, the detector signals associated with the hollow spheres 70, 72, 74 and 76 no longer correspond to one another.

If the signals associated with the hollow spheres 70 and 72 deviate from one another, the regulating means 102 sends a control signal via the line 104 to the moving means 28 so that the moving means 28 pivots the mirror 14 about the second pivot axis 26 until the signals associated with the hollow spheres 70 and 72 again correspond to one another.

If the signals associated with the hollow spheres 74 and 76 deviate from one another, the regulating means 102 sends a control signal via the line 104 to the moving means 28 so that the moving means 28 pivots the mirror 14 about the first pivot axis 24 until the signals associated with the hollow spheres 74 and 76 again correspond to one another.

The mirror 14 therefore automatically tracks the sun due to the described regulation and so its optical axis 18 always coincides with the average direction of the bundles of rays 16 coming from the sun and the focal spot generated on the absorber 30 and the aperture flange 36 is radially symmetric to the focal point 20.

This means that the solar radiation flux onto the absorbing end wall 32 of the absorber 30 is maximized, and the formation of high temperature gradients at the absorbing end wall 32, which could lead to damage to the absorber 30, is avoided.

The embodiment of an inventive device for concentrating solar radiation as described may be easily modified, inter alia, by altering the radial distance of the hollow spheres 70, 72, 74 and 76 from the focal point 20 or the number of hollow spheres.

Figure 5:
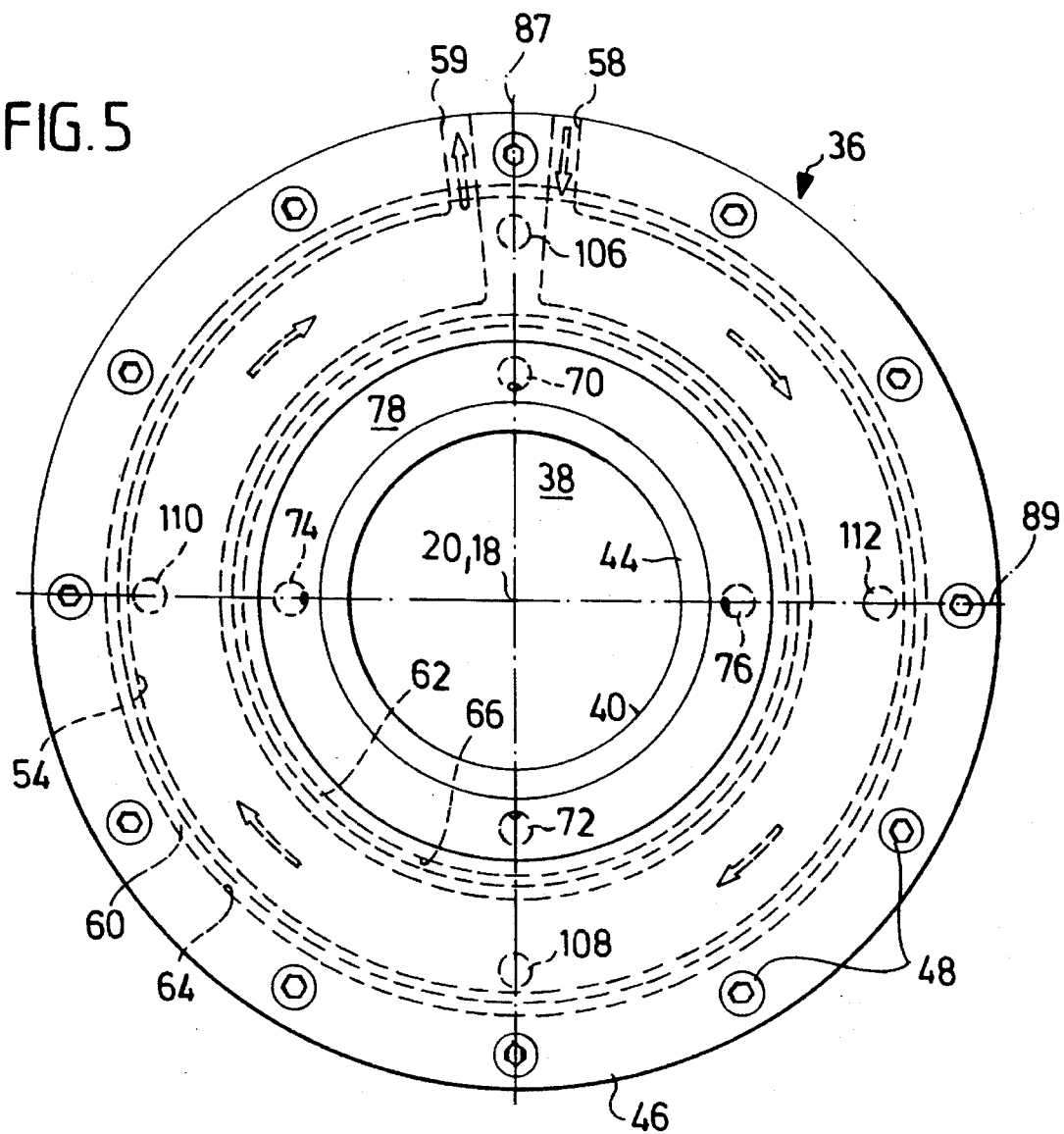
FIG. 5 is a plan view of an aperture flange of a second embodiment of an inventive device for concentrating solar radiation.

In a second embodiment of the inventive device for concentrating solar radiation, the aperture flange 36 of which is illustrated in FIG. 5, it can, in particular, be provided for an additional pair of hollow spheres 106, 108 and 110, 112, respectively, to be present for each pair of hollow spheres 70, 72 and 74, 76 and be coaxial to the respective pair. In this respect, the hollow spheres 106, 108, 110 and 112 are at a greater distance from the focal point 20 than the hollow spheres 70, 72, 74 and 76. The hollow spheres 106, 108, 110 and 112 are of essentially the same construction as the hollow spheres 70, 72, 74 and 76 and, like these, form together with light detectors (not illustrated) measuring means for measuring the flux density of the solar radiation incident on the aperture flange 36.

The detector signals associated with the hollow spheres 106, 108, 110 and 112 located farther outwards can be used for a rough regulation of the alignment of the concentrator element 12 when the optical axis 18 of the mirror 14 already deviates from the average direction of incidence of the bundles of radiation 16 coming from the sun to such an extent that the maximum radiation flux density of the focal spot is at a greater distance from the focal point 20 than the inlet openings 86 of the hollow spheres 70, 72, 74 and 76 located farther inwards.

The present disclosure relates to the subject matter disclosed in German application No. P 44 46 303.0 of Dec. 23, 1994, the entire specification of which is incorporated herein by reference.

What is claimed is:

1. Device for concentrating solar radiation onto an absorber, comprising a concentrator element concentrating incident solar radiation in a focal spot on the absorber, characterized in that the device (10) has at least one measuring means for measuring the flux density of the solar radiation in the region of the focal spot and that the measuring means comprises an inlet opening (86), part of the solar radiation passing through said opening into the measuring means, a diffuser (70, 72, 74, 76; 106, 108, 110, 112) for reducing the flux density of the solar radiation reaching the measuring means and a detector (98) for measuring the flux density reduced by means of the diffuser (70, 72, 74, 76; 106, 108, 110, 112).

2. Device as defined in claim 1, characterized in that the device has a regulating means (102) altering the relative alignment of the concentrator element (12) in relation to the solar radiation as a function of the result of the measurement.

3. Device as defined in claim 1, characterized in that the measuring means has an inlet passage (84), part of the solar radiation passing through said passage to reach the inlet opening (86).

4. Device as defined in claim 1, characterized in that the device comprises at least one pair of measuring means.

5. Device as defined in claim 4, characterized in that a straight line connection (87, 89) connecting the inlet openings (86) of the measuring means of the pair with one another intersects an optical axis (18) of the concentrator element (12).

6. Device as defined in claim 5, characterized in that the inlet openings (86) of the measuring means of the pair are arranged symmetric to the optical axis (18) of the concentrator element (12).

7. Device as defined in claim 6, characterized in that a straight line connection (87, 89) connecting the inlet openings (86) of the measuring means of the pair with one another is aligned essentially at right angles to a pivot axis (24, 26) of the concentrator element (12).

8. Device as defined in claim 6, characterized in that the device (10) comprises at least two pairs of measuring means, wherein the inlet openings (86) of the measuring means of each pair are arranged symmetric to the optical axis (18) of the concentrator element (12).

9. Device as defined in claim 8, characterized in that a straight line connection (87) connecting the inlet openings (86) of the measuring means of one pair with one another is aligned transversely, in particular at right angles, to a straight line connection (89) connecting the inlet openings (86) of the measuring means of an additional pair with one another.

10. Device as defined in claim 8, characterized in that a straight line connection (87; 89) connecting the inlet openings (86) of the measuring means of one pair with one another is aligned parallel to a straight line connection (87; 89) connecting the inlet openings (86) of the measuring means of an additional pair with one another and the inlet openings (86) of the one pair have a greater radial distance from the optical axis (18) of the concentrator element (12) than the inlet openings (86) of the additional pair.

11. Device as defined in claim 1, characterized in that the diffuser (70, 72, 74, 76; 106, 108, 110, 112) has a surface diffusely reflecting the solar radiation reaching the measuring means.

12. Device as defined in claim 11, characterized in that the diffuser (70, 72, 74, 76; 106, 108, 110, 112) comprises a hollow body closed except for the inlet opening (86) and an outlet opening (90) for the detector (102).

13. Device as defined in claim 12, characterized in that the closed hollow body has the shape of a hollow sphere.

14. Device as defined in claim 12, characterized in that the hollow body comprises two recesses (80, 82) in two solid bodies (44, 46) abutting on one another.

15. Device as defined in claim 11, characterized in that the diffusely reflecting surface is very much larger, preferably larger by at least a factor of 100, than the area of the inlet opening (86).

16. Device as defined in claim 11, characterized in that the diffusely reflecting surface has a degree of reflection of approximately 0.7 to 0.9, said degree of reflection being essentially independent of the frequency of the incident radiation.

17. Device as defined in claim 11, characterized in that the diffusely reflecting surface is provided with a dull-white paint.

18. Device as defined in claim 11, characterized in that the degree of reflection of the diffusely reflecting surface essentially does not vary from room temperature up to a temperature of over 1000° C.

19. Device as defined in claim 1, characterized in that the diffuser (70, 72, 74, 76; 106, 108, 110, 112) is cooled.

20. Device as defined in claim 1, characterized in that the measuring means is arranged in an aperture stop (36) of the device (10).

21. Device as defined in claim 1, characterized in that the measuring means has a shield (94) preventing solar radiation from passing directly from the inlet opening (86) to the detector (102).

22. Device as defined in claim 1, characterized in that the detector (102) comprises an optical detector.

23. Device as defined in claim 22, characterized in that the detector (102) comprises a semiconductor photodetector.

24. Device as defined in claim 1, characterized in that the detector (102) comprises a light guide (96) coupled to the diffuser (70, 72, 74, 76; 106, 108, 110, 112).

* * * * *